(12) United States Patent
Sanada et al.

(10) Patent No.: US 7,086,296 B2
(45) Date of Patent: Aug. 8, 2006

(54) TORQUE SENSOR

(75) Inventors: Takahiro Sanada, Kashihara (JP); Masayuki Yamamoto, Kasugai (JP)

(73) Assignees: Favess Co., Ltd., Aichi (JP); Koyo Seiko Co., Ltd., Osaka (JP); Toyoda Koki Kabushiki Kaisha, Aichi (JP)

( * ) Notice: Subject to any disclaimer, the term of this patent is extended or adjusted under 35 U.S.C. 154(b) by 0 days.

(21) Appl. No.: 11/219,583

(22) Filed: Sep. 1, 2005

(65) Prior Publication Data

US 2006/0048586 A1 Mar. 9, 2006

(30) Foreign Application Priority Data

Sep. 3, 2004 (JP) ............................. 2004-257098

(51) Int. Cl.
*G01L 3/02* (2006.01)
*G01L 3/10* (2006.01)
*G01L 3/12* (2006.01)
*G01L 3/14* (2006.01)

(52) U.S. Cl. .............................................. 73/862.331
(58) Field of Classification Search ...................... None
See application file for complete search history.

(56) References Cited

U.S. PATENT DOCUMENTS 6,895,828 B1    5/2005  Nakatani et al. ....... 73/862.331
6,925,893 B1 *  8/2005  Abe et al. .............. 73/862.332

FOREIGN PATENT DOCUMENTS

JP          3-48740      5/1991
JP          2004-170250  6/2004

* cited by examiner

*Primary Examiner*—Max Noori
*Assistant Examiner*—Octavia Davis
(74) *Attorney, Agent, or Firm*—Jordan and Hamburg, LLP

(57) ABSTRACT

In a torque sensor, a first detection tube (13) made from magnetic material covers a cylindrical magnetic leak prevention member (12) that is made from nonmagnetic material and covers a first shaft (3) made from magnetic material. Magnetic resistance to magnetic flux, which passes through one end of the first detection tube (13) and one end of a second detection tube (14) that is made from magnetic material and rotates together with a second shaft (4), changes according to elastic relative rotation of the two shafts (3, 4) corresponding to transmitted torque, by providing a plurality of teeth (13a, 14a) along the circumferential direction at the one end of each detection tube (13, 14). The first shaft (3) and the first detection tube (13) are integrated with the magnetic leak prevention member (12) so that they can rotate together, by being inserted in a mold for forming the magnetic leak prevention member (12) before the synthetic resin material is poured into the mold. The circumferential width of each resin holding space (13A) between the teeth (13a) arranged along the circumferential direction at one end of the first detection tube (13) decreases gradually toward the other end of the first detection tube (13). The synthetic resin material solidified in the resin holding spaces (13A) is pressed against the teeth (13a) due to shrinkage thereof.

1 Claim, 10 Drawing Sheets

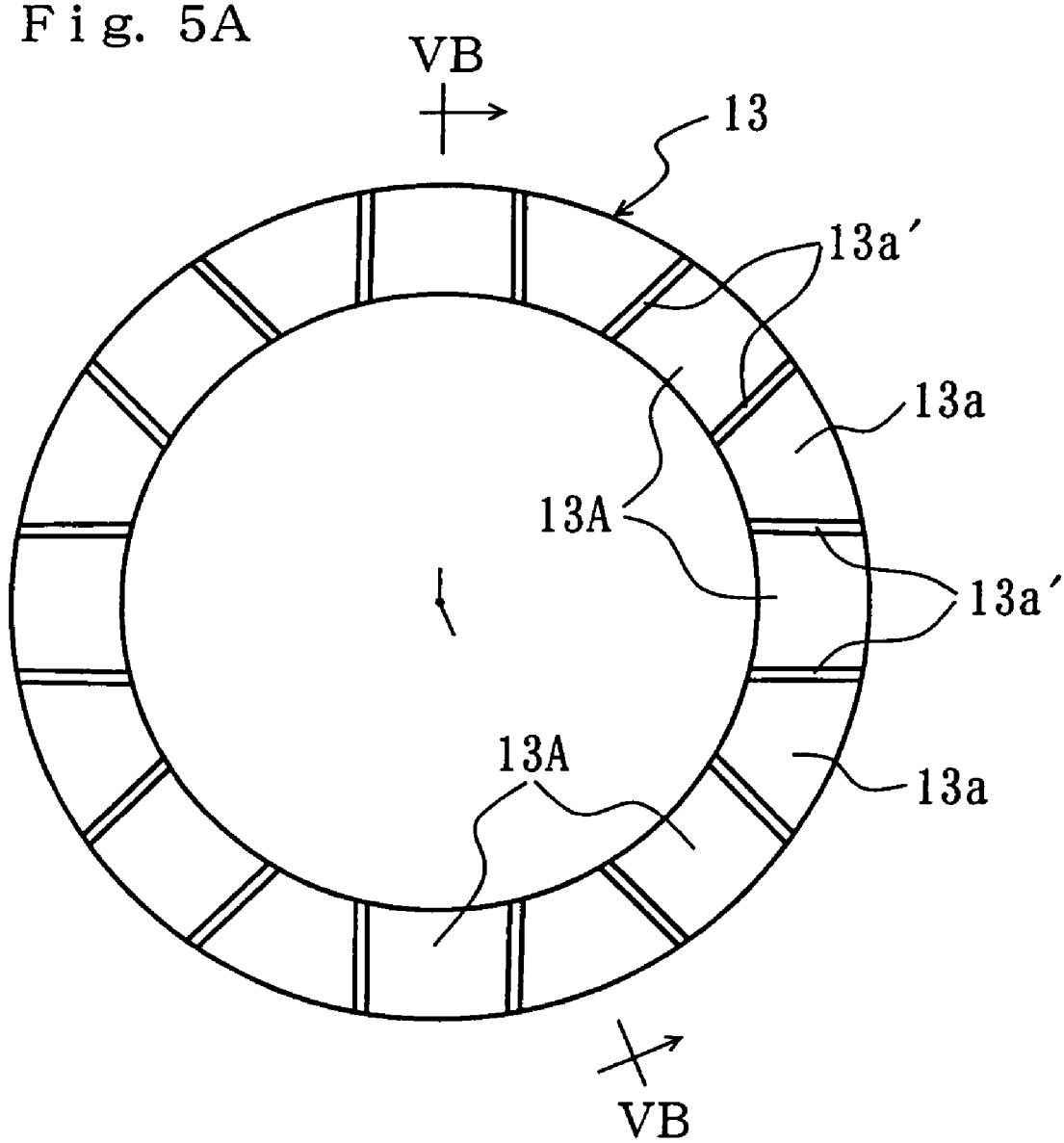

Prior Art

TORQUE SENSOR

FIELD OF THE INVENTION

The present invention relates to a torque sensor suitable for detecting, for example, steering torque in a power steering apparatus providing steering assist power corresponding to the steering torque.

DESCRIPTION OF THE RELATED ART

Torque sensors for detecting torque transmitted by first and second shafts, which are made from magnetic material and rotating elastically with respect to each other, based on changes in magnetic resistance have been already generally used. In such torque sensors, the outer periphery of a magnetic leak prevention member made from nonmagnetic material to cover the outer periphery of the first shaft is covered by a first detection tube made from magnetic material, a second detection tube made from a magnetic material is integrated with the second shaft, a magnetic circuit is constituted with a coil by generating magnetic flux passing through one end of the first detection tube and one end of the second detection tube, and a plurality of teeth are provided at the one end of the first detection tube and the one end of the second detection tube so as to be arranged along the circumferential direction, so that magnetic resistance to magnetic flux in the magnetic circuit changes according to the amount of elastic relative rotation corresponding to the torque transmitted by the two shafts.

In torque sensors such as described above, the decrease in detection accuracy is prevented by preventing magnetic leak from the first detection tube to the first shaft with the magnetic leak prevention member. It was proposed to integrate the first shaft, first detection tube, and magnetic leak prevention member so that they rotate together, by the so-called insert molding in which the magnetic leak prevention member is molded from synthetic resin material poured into a mold, and the first shaft and first detection tube are inserted in the mold before the synthetic resin material is poured thereinto (Japanese Patent Application Laid-open No. 2004-170250).

SUMMARY OF THE INVENTION

In the above-described conventional torque sensor, as shown in FIG. 8 and FIG. 9, a magnetic leak prevention member 101 and first detection tube 102 are integrated so that they rotate together, by solidifying the synthetic resin material poured into a mold for forming the magnetic leak prevention member 101 at each space between teeth 102$a$ arranged along the circumferential direction at one end of the first detection tube 102. However, opposing surfaces 102$a'$ of the adjacent teeth 102$a$ are parallel to the axial direction of the first detection tube 102, so that gaps appear between the opposing surfaces 102$a'$ and the synthetic resin material, when the synthetic resin material solidified between the teeth 102$a$ arranged along the circumferential direction shrinks with the passage of time as shown by a two-dot-dash line in FIG. 9. The resultant problem is that the first detection tube 102 is loosened with respect to the magnetic leak prevention member 101 and torque detection accuracy decreases. It is an object of the present invention to provide a torque sensor capable of resolving this problem.

The torque sensor according to the present invention comprises a first shaft made from magnetic material, a second shaft connected to the first shaft so that they can rotate elastically with respect to each other, a magnetic leak prevention member made from nonmagnetic material and covering the outer periphery of the first shaft, a first detection tube made from magnetic material and covering the outer periphery of the magnetic leak prevention member, a second detection tube made from magnetic material, integrated with the second shaft so that they can rotate together, and disposed so that one end thereof faces one end of the first detection tube via a gap, and a coil constituting a magnetic circuit by generating magnetic flux passing through the one end of the first detection tube and the one end of the second detection tube, wherein a plurality of teeth that are arranged along the circumferential direction are provided at the one end of the first detection tube and at the one end of the second detection tube so that magnetic resistance to magnetic flux in the magnetic circuit changes according to the amount of relative rotation of the two shafts, the magnetic leak prevention member is molded from synthetic resin material poured into a mold, the first shaft and the first detection tube are integrated with the molded magnetic leak prevention member so that they can rotate together, by being inserted in the mold before the synthetic resin material is poured thereinto, each space between the adjacent teeth arranged along the circumferential direction at the one end of the first detection tube serves as a resin holding space, the magnetic leak prevention member has a portion solidifying in the resin holding spaces, and the circumferential width of the resin holding space decreases gradually toward the other end of the first detection tube so that the synthetic resin material solidified in the resin holding spaces is pressed against the teeth due to shrinkage thereof.

The synthetic resin material, which is solidified in each resin holding space between the teeth arranged along the circumferential direction at the one end of the first detection tube, shrinks in the circumferential direction and also shrinks toward the other end of the first detection tube. In accordance with the present invention, the circumferential width of the resin holding space decreases gradually toward the other end of the first detection tube. Therefore, the synthetic resin material solidified in the resin holding spaces is pressed against each tooth in a wedge-like manner by shrinking toward the other end of the first detection tube, regardless of shrinking in the circumferential direction. As a result, looseness of the first detection tube with respect to the magnetic leak prevention member can be prevented.

In the torque sensor according to the present invention, when the magnetic leak prevention member made from synthetic resin material is integrated with the first detection tube by the insert molding, the torque detection accuracy can be increased by preventing the looseness of the first detection tube caused by the shrinkage of synthetic resin.

BRIEF DESCRIPTION OF THE DRAWINGS

FIG. 5A is a front view of the first detection tube in the torque sensor of the embodiment of the present invention.

DESCRIPTION OF THE PREFERRED EMBODIMENTS

Figure 1:
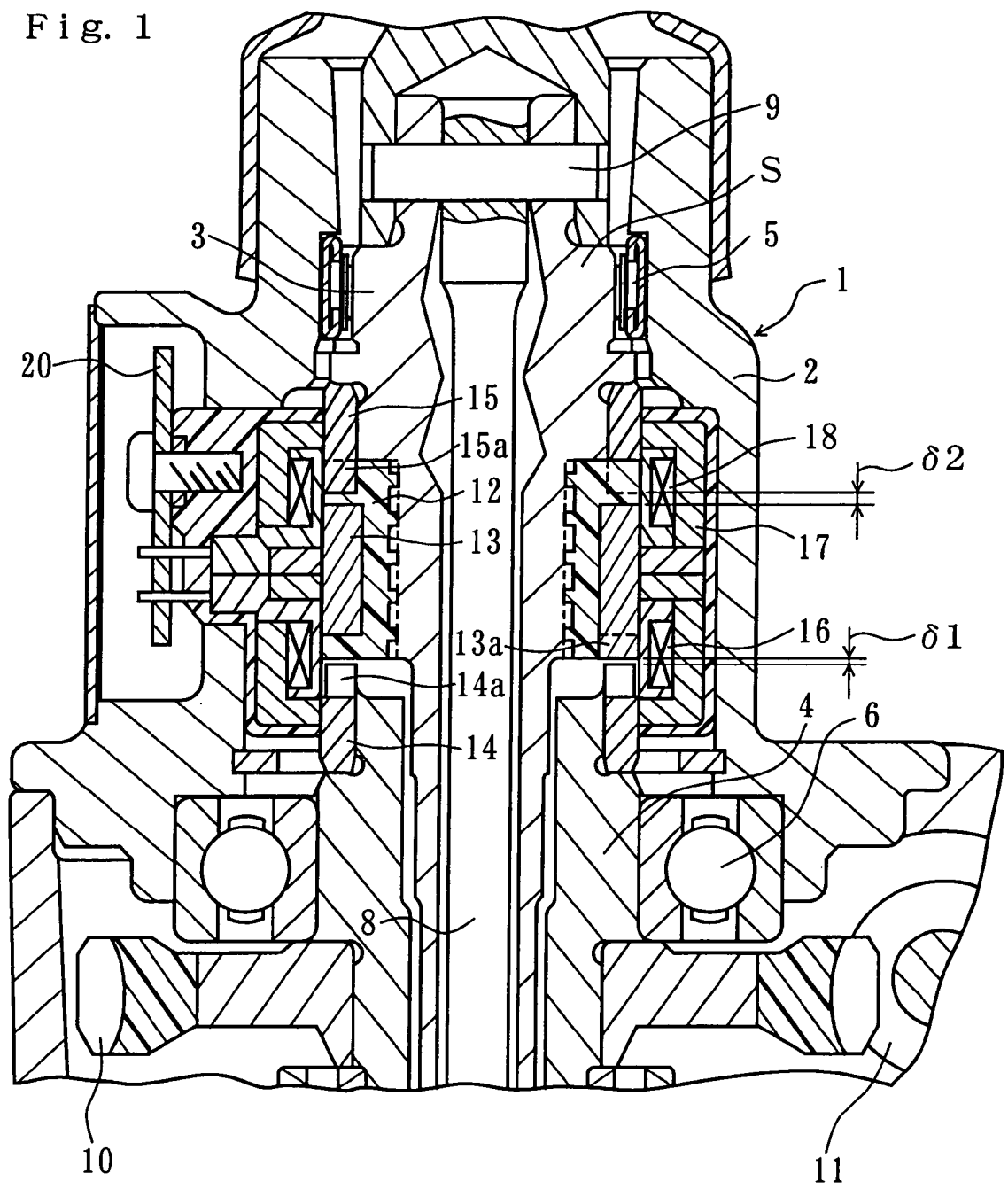
FIG. 1 is a longitudinal cross-sectional view of a torque sensor, which is an embodiment of the present invention.

A torque sensor 1 shown in FIG. 1 is used for a power steering device of an automobile and comprises a housing 2 and a torque transmission shaft for transmitting steering torque. The torque transmission shaft has a first shaft 3 made from magnetic material and a second shaft 4 made from magnetic material. The first shaft 3 is rotatably supported by the housing 2 via a bearing 5 and connected to a steering wheel not shown in the figure. The second shaft 4 is rotatably supported by the housing 2 via a bearing 6 and connected to wheels of the automobile via a steering gear not shown in the figure. A torsion bar 8 inserted into central holes of the first shaft 3 and the second shaft 4 is connected to the first shaft 3 at one end thereof with a pin 9 and connected to the second shaft 4 at the other end thereof via a pin or the like not shown in the figure. As a result, the second shaft 4 is connected to the first shaft 3 so as to be capable of elastic coaxial relative rotation with respect to the first shaft 3. A worm wheel 10 is attached to the outer periphery of the second shaft 4, and a worm 11 engaged with the worm wheel 10 is driven for generating steering assist power by a motor (not shown in the figure) attached to the housing 2.

The outer periphery of the first shaft 3 is covered with a cylindrical magnetic leak prevention member 12 made from nonmagnetic material. The outer periphery of the magnetic leak prevention member 12 is covered with a first detection tube 13 made from magnetic material. A second detection tube 14 made from magnetic material is integrated with the outer periphery of the second shaft 4 by press fitting, and so on so that they 4, 14 can rotate together. A third detection tube 15 made from magnetic material is integrated with the outer periphery of the first shaft 3 by press fitting, and so on so that they 3, 15 can rotate together. One end of the first detection tube 13 is disposed so as to face one end of the second detection tube 14 via a gap $\delta 1$. The other end of the first detection tube 13 is disposed so as to face one end of the third detection tube 15 via a gap $\delta 2$. A plurality of teeth 13a, 14a, 15a that are arranged along the circumferential direction are provided at the one end of the first detection tube 13, the one end of the second detection tube 14, and the one end of the third detection tube 15. The other end of the first detection tube 13 is a flat surface.

The magnetic leak prevention member 12 is molded by pouring synthetic resin material into a mold. The first shaft 3 and the first detection tube 13 are integrated with the molded magnetic leak prevention member 12 so that they 3, 12, 13 can rotate together, by being inserted in the mold before the synthetic resin material is poured thereinto. The first shaft 3 can be inserted in the mold with being connected to the third detection tube 15.

Figure 2:
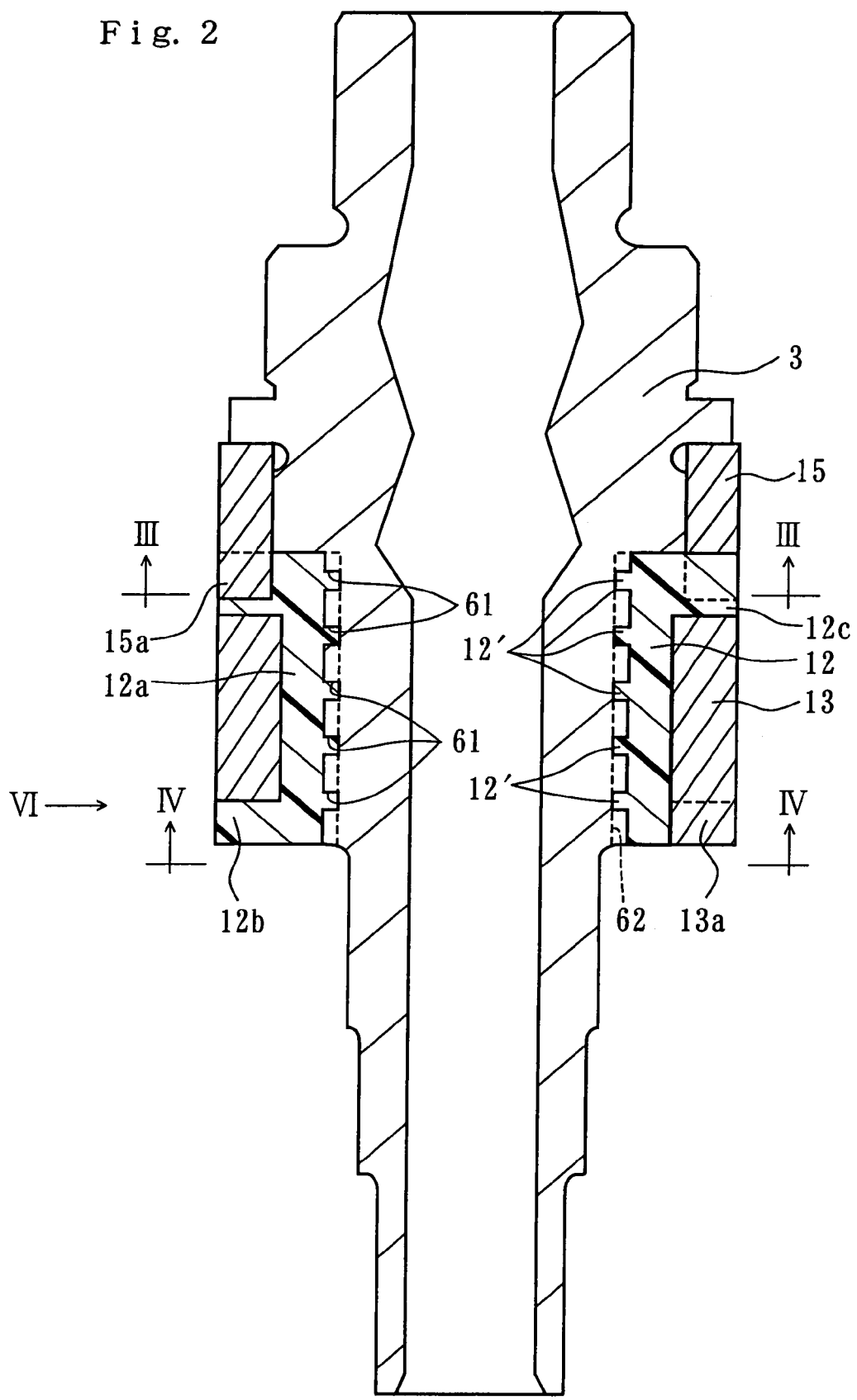
FIG. 2 is a longitudinal sectional view of the first shaft, first detection tube, third detection tube, and magnetic leak prevention member of the embodiment of the present invention.
Figure 3:
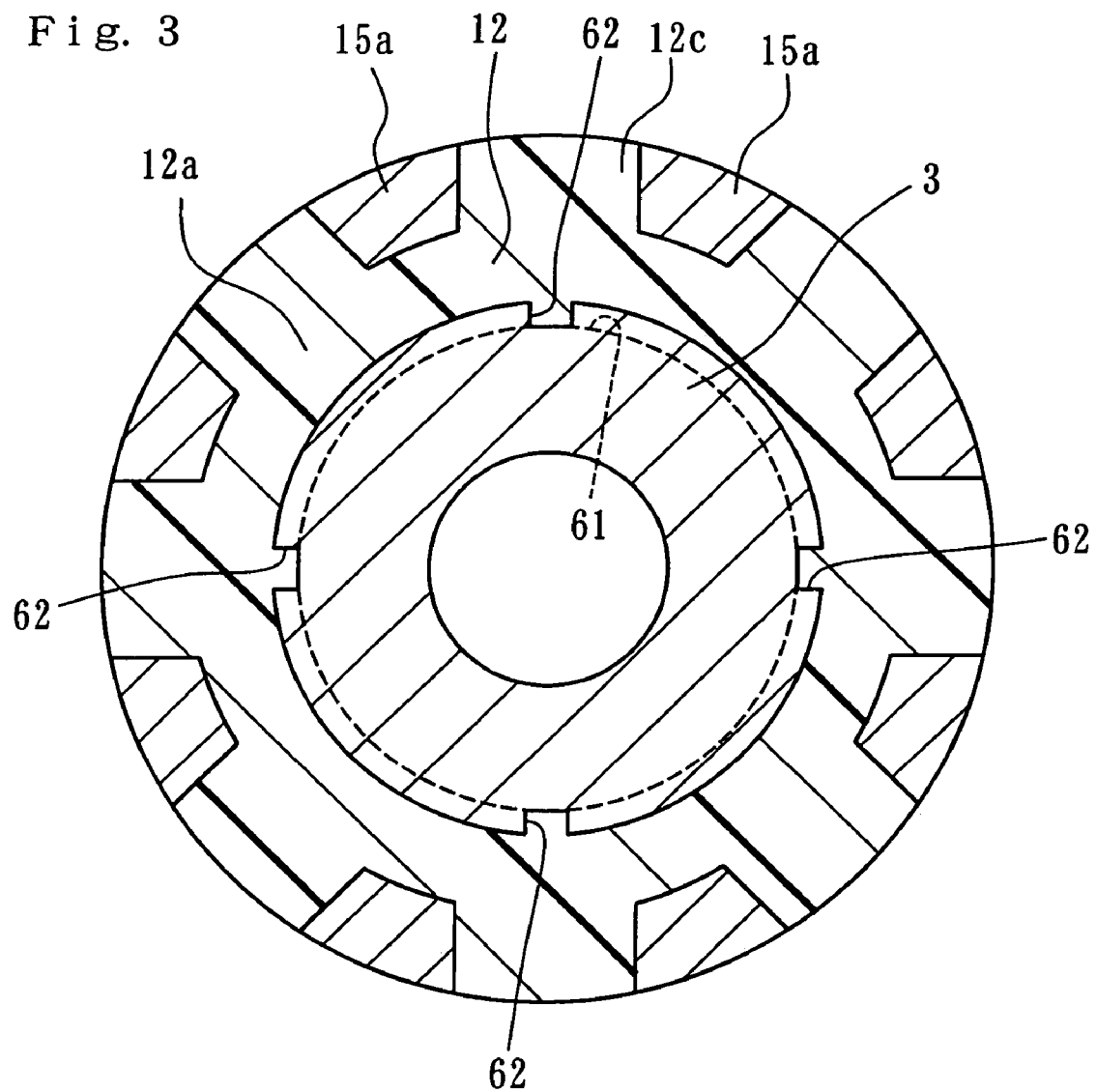
FIG. 3 is a cross-sectional view along a III—III line in FIG. 2.
Figure 4:
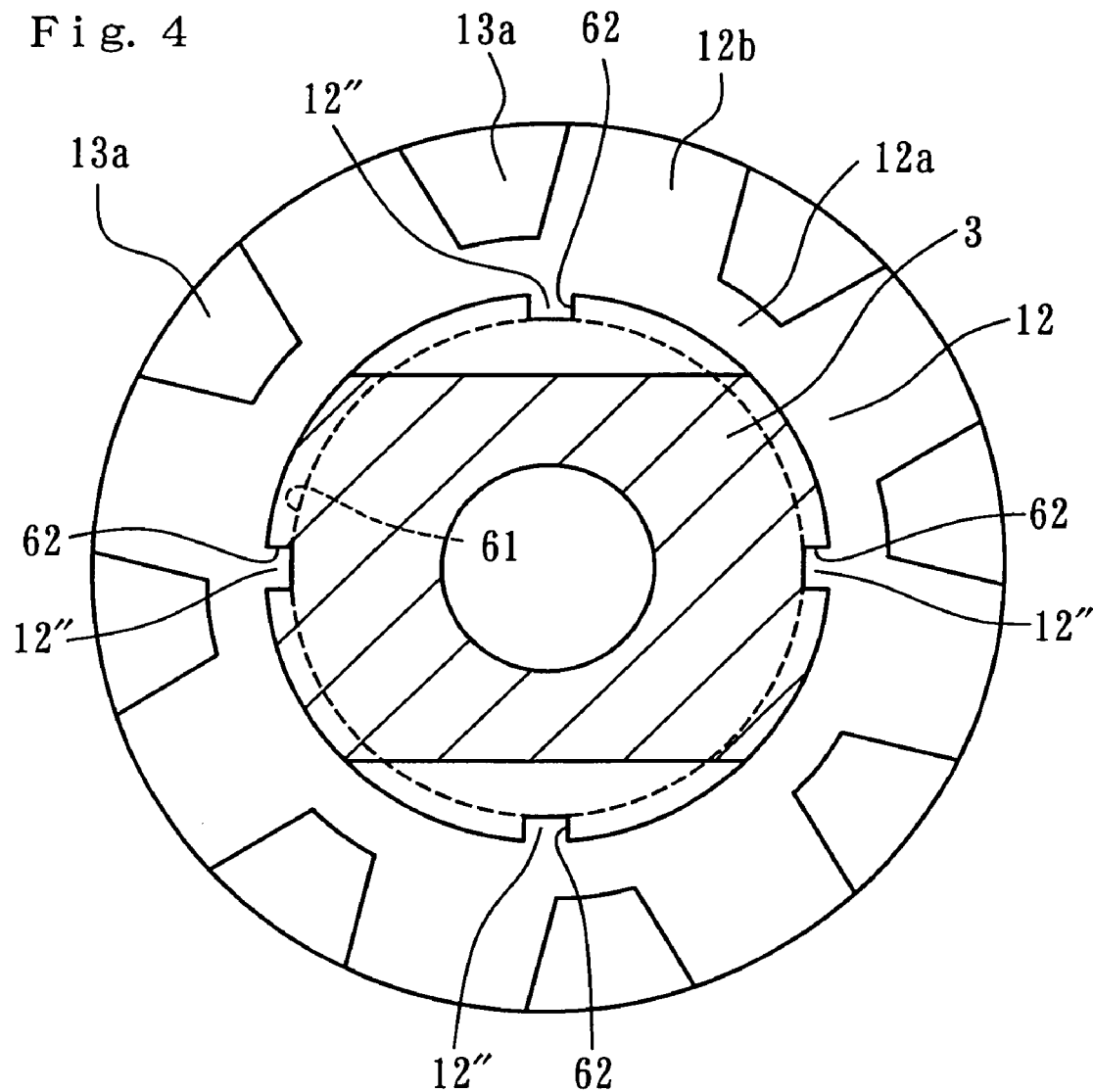
FIG. 4 is a cross-sectional view along a IV—IV line in FIG. 2.

As shown in FIGS. 2 to 4, the magnetic leak prevention member 12 has a cylindrical portion 12a, a first outwardly extending portion 12b that extends outwardly from one axial end of the cylindrical portion 12a, and a second outwardly extending portion 12c that extends outwardly from the other axial end of the cylindrical portion 12a. The first outwardly extending portion 12b, is located in each space between the adjacent teeth 13a arranged along the circumferential direction at the one axial end of the first detection tube 13. The second outwardly extending portion 12c is located in the gap d2 between the other axial end of the first detection tube 13 and the one axial end of the third detection tube 15 and in each space between the adjacent teeth 15a arranged along the circumferential direction at the one axial end of the third detection tube 15.

Figure 5B:
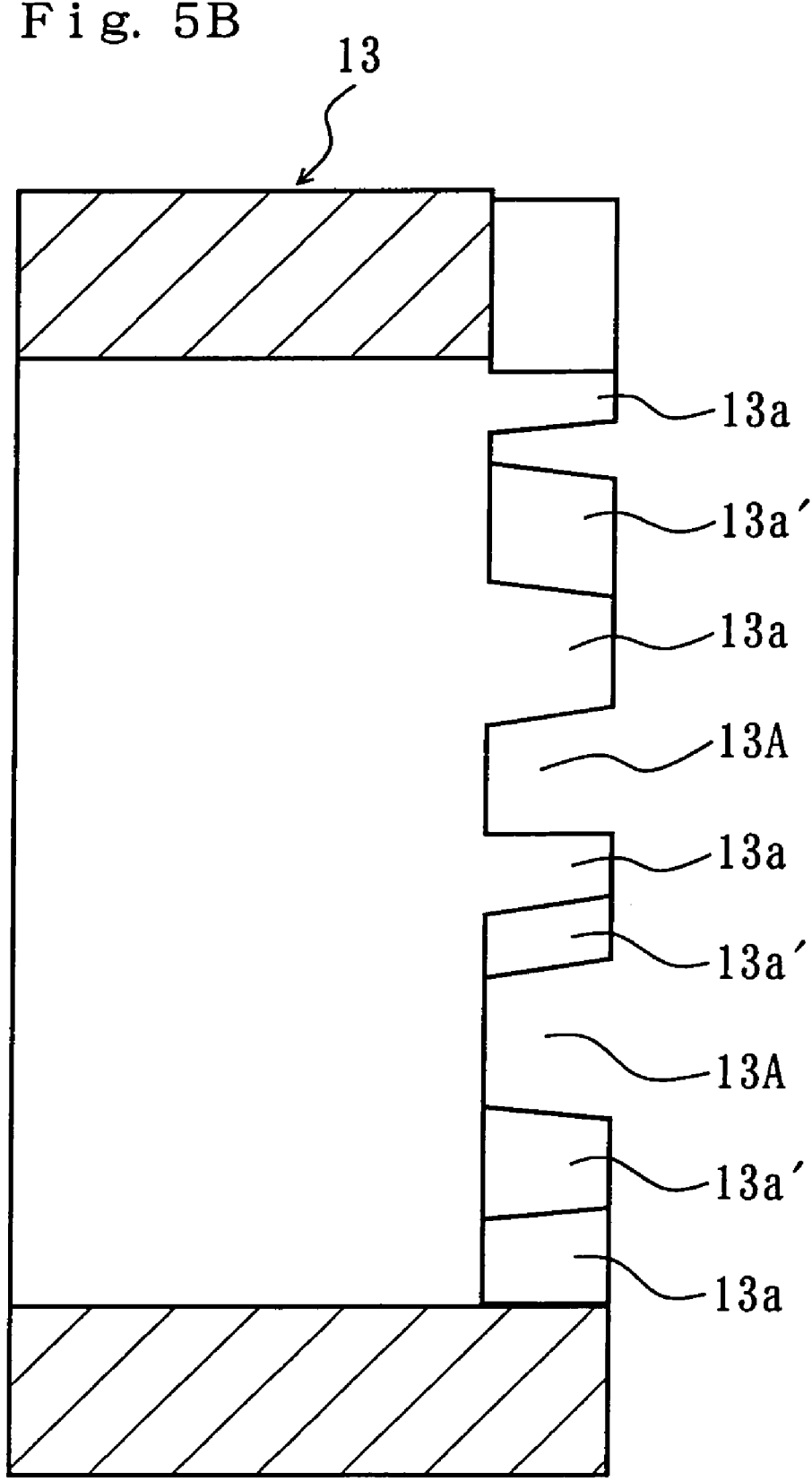
FIG. 5B is a cross-sectional view along a VB—VB line in FIG. 5A.
Figure 6:
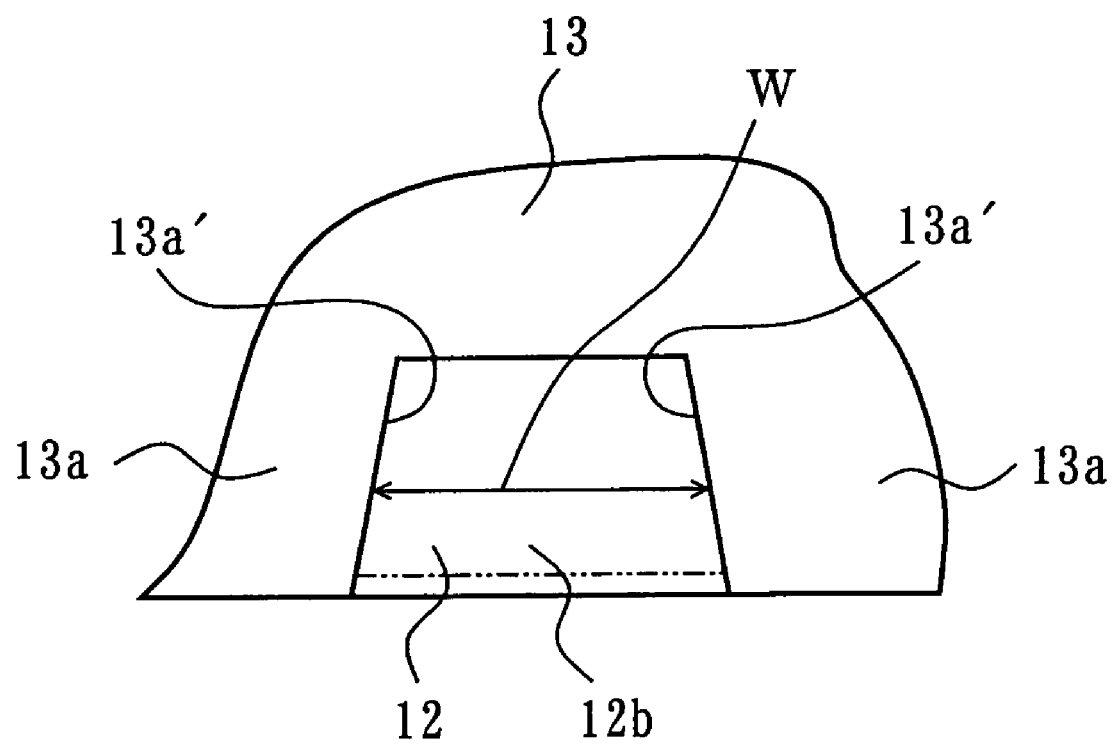
FIG. 6 is a view along a VI arrow in FIG. 2.

As shown in FIG. 5A, FIG. 5B, and FIG. 6, each space between the adjacent teeth 13a arranged along the circumferential direction at the one axial end of the first detection tube 13 serves as a resin holding space 13A, and the first outwardly extending portion 12b solidifies in the resin holding spaces 13A. The surface of each tooth 13a that faces the surface of the adjacent tooth 13a serves as a pressure-receiving surface 13a' inclined to the axial direction of the first detection tube 13, so that the circumferential width W of the resin holding space 13A decreases gradually toward the other axial end of the first detection tube 13. As a result, the synthetic resin material solidifying in the resin holding spaces 13A to form the first outwardly extending portion 12b is pressed against the pressure-receiving surfaces 13a' of the teeth 13a in a wedge-like manner due to shrinkage thereof toward the other axial end of the first detection tube 13 as shown by a double-dot-dash line in FIG. 6, with shrinkage thereof in the circumferential direction. The opposing surfaces of the adjacent teeth 14a, 15a of the second detection tube 14 and the third detection tube 15 can be parallel to the axial direction as in the conventional structures.

As shown in FIGS. 2 to 4, a plurality of circumferential grooves 61 as an axial displacement restraining section are provided on the outer periphery of the first shaft 3 at intervals in the axial direction to restrain the displacement of the magnetic leak prevention member 12 in the axial direction of the first shaft. Annular protrusions 12' provided on the inner periphery of the magnetic leak prevention member 12 are fitted in the circumferential grooves 61. Furthermore, a plurality of axial grooves 62 as a circumferential displacement restraining section are provided on the outer periphery of the first shaft 3 at intervals in the circumferential direction to restrain the displacement of the magnetic leak prevention member 12 in the circumferential direction of the first shaft. Protrusions 12" provided on the inner periphery of the magnetic leak prevention member 12 are fitted in the axial grooves 62.

As shown in FIG. 1, a first coil 16 and a second coil 18 covering the torque transmission shaft are accommodated in a holder 17 that is made from magnetic material and held by the housing 2. The first coil 16 generates magnetic flux passing through the one end of the first detection tube 13 and the one end of the second detection tube 14, so that a first magnetic circuit is constituted. The second coil 18 generates magnetic flux passing through the other end of the first detection tube 13 and the one end of the third detection tube 15, so that a second magnetic circuit is constituted.

Figure 7:
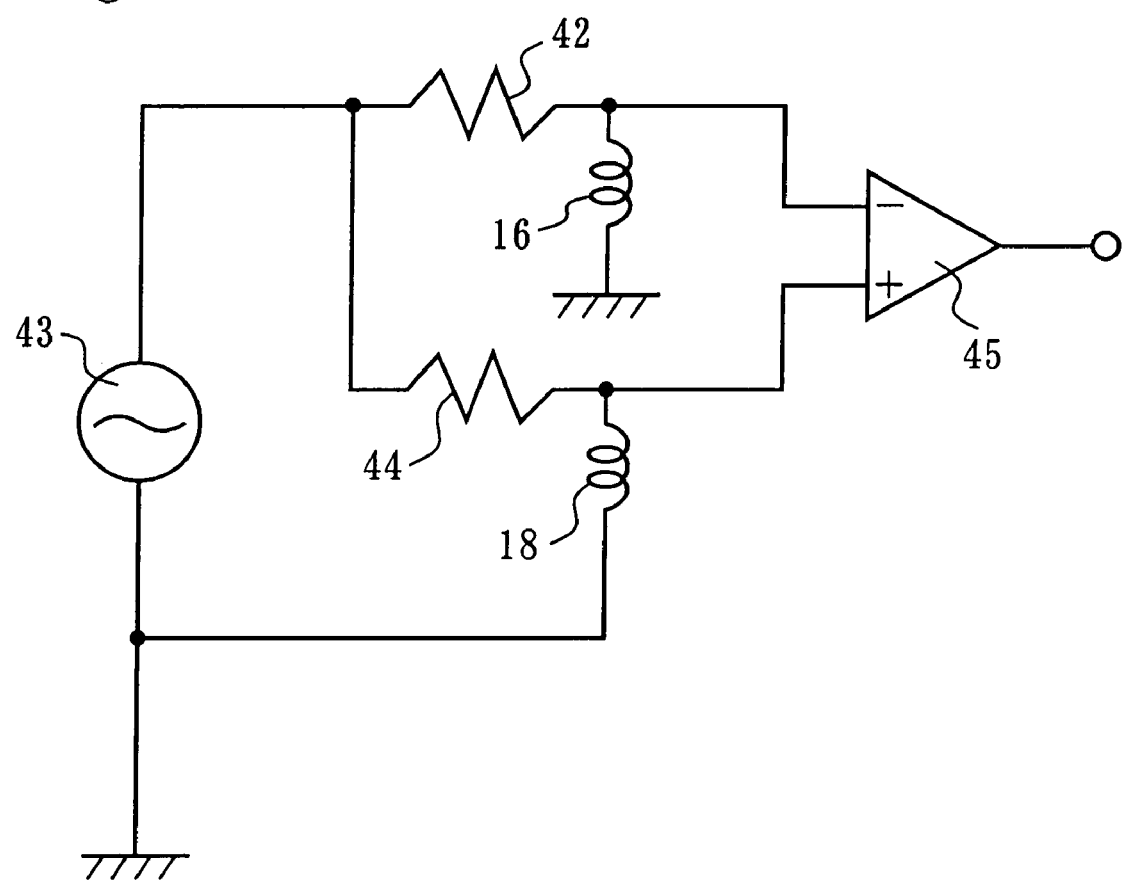
FIG. 7 is a structural explanatory drawing of a detection circuit in the torque sensor of the embodiment of the present invention.
Figure 8:
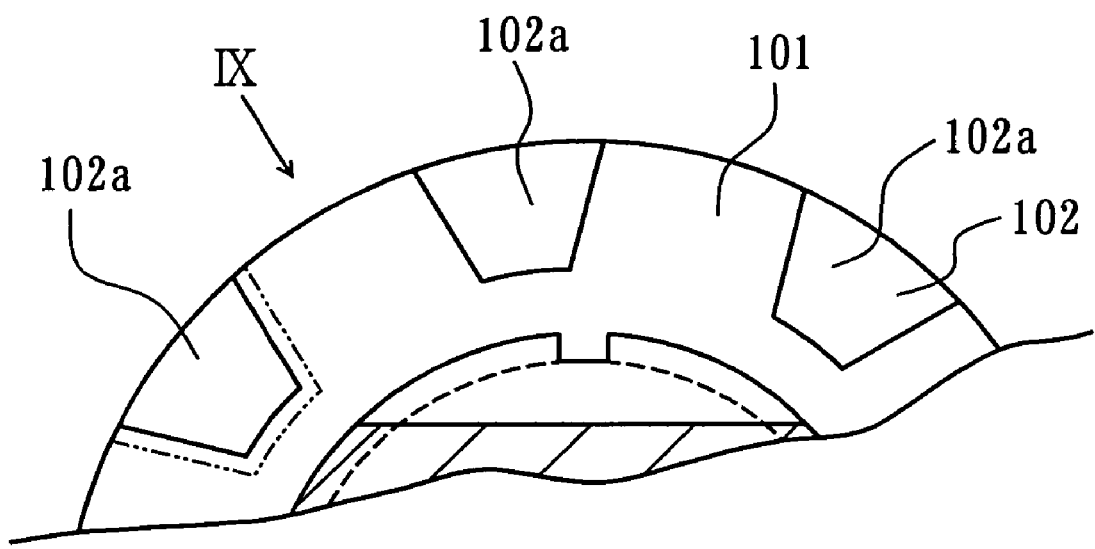
FIG. 8 is a partial lateral sectional view of the conventional torque sensor.
Figure 9:
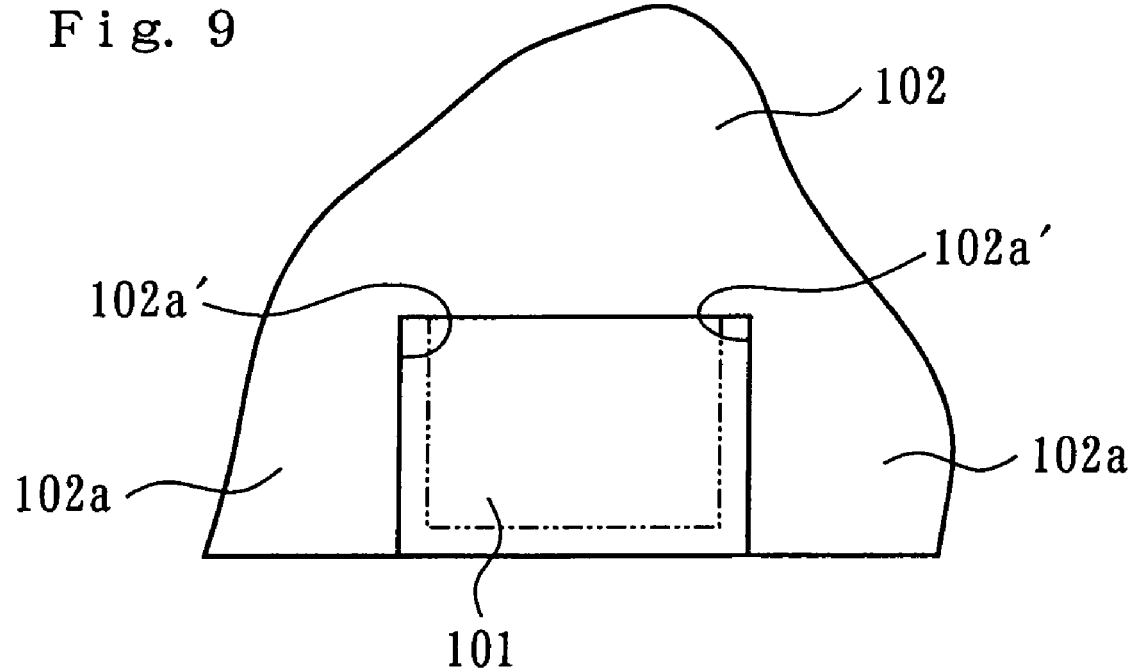
FIG. 9 is a view along a IX arrow in FIG. 8.

A detection circuit connected to the coils 16, 18 are provided on a circuit substrate 20. FIG. 7 shows an example of the detection circuit, in which the first coil 16 is connected to an oscillator 43 via a resistor 42, and the second coil 18 is connected to the oscillator 43 via a resistor 44. Furthermore, the first coil 16 is connected to an inverted input terminal of an operational amplifier 45, and the second coil 18 is connected to the non-inverted input terminal of the operational amplifier 45. During torque transmission by the two shafts 3, 4, the torsion bar 8 is twisted correspondingly to the torque, and the first detection tube 13 and the second detection tube 14 rotate coaxially with respect to each other. This relative rotation changes the surface area of the portion where the teeth 13a at the one end of the first detection tube 13 and the teeth 14a at the one end of the second detection tube 14 overlap in the circumferential direction. As a result, the magnetic resistance to the magnetic flux in the first magnetic circuit changes according to the amount of the elastic relative rotation of the two shafts 3, 4 caused by the change in the torque. The output of the first coil 16 changes correspondingly to this change. Because the first detection tube 13 and the third detection tube 15 rotate together, the magnetic resistance to the magnetic flux in the second magnetic circuit does not fluctuate under the effect of the change in the transmitted torque provided by the two shafts 3, 4. The magnetic resistance in the first magnetic circuit is equal to the magnetic resistance in the second magnetic circuit when no torque is transmitted by the two shafts 3, 4. As a result, the detection signal of the torque transmitted by the torque transmitting shaft is generated by the detection circuit based on the output of the first coil 16 dependent on the change of the magnetic resistance in the first magnetic circuit. Furthermore, because the magnetic resistance in the second magnetic circuit through which the magnetic flux generated in the second coil 18 passes does not fluctuate under the effect of the change in the torque transmitted by the torque transmitting shaft, output fluctuations of the first coil 16 and output fluctuations of the second coil 18 caused by temperature fluctuations cancel each other in the operational amplifier 45. Thus, the torque transmitted by the two shafts 3, 4 is detected based on the difference between a value corresponding to the changes in magnetic resistance to the magnetic flux in the first magnetic circuit and a value corresponding to the changes in magnetic resistance to the magnetic flux in the second magnetic circuit. Furthermore, fluctuations of the detected torque caused by temperature fluctuations are compensated. The steering assist power is provided by driving the motor for generating the steering assist power correspondingly to the detection torque.

With the above-described embodiment, the magnetic leak prevention member 12, which is located between the first shaft 3 and the first detection tube 13, is molded by pouring synthetic resin material into the mold in which the first shaft 3 and the first detection tube 13 are inserted. Therefore, the first shaft 3 and the first detection tube 13 can be integrated with the magnetic leak prevention member 12. To achieve such an integration, the synthetic resin material forming the magnetic leak prevention member 12 is solidified in each resin holding space 13A between the teeth 13a arranged along the circumferential direction at the one end of the first detection tube 13. Since the circumferential width W of the resin holding space 13A decreases gradually toward the other end of the first detection tube 13, the synthetic resin material solidified in the resin holding spaces 13A is pressed against the pressure-receiving surfaces 13a' of the teeth 13a in a wedge-like manner by shrinking toward the other end of the first detection tube 13, regardless of shrinking in the circumferential direction. As a result, the first detection tube 13 can be prevented from loosening with respect to the magnetic leak prevention member 12 and the decrease in torque detection accuracy can be prevented.

Furthermore, when the magnetic leak prevention member 12 thermally shrinks in a low-temperature environment or in the mold during cooling or thermally expands in a high-temperature environment, the displacement in the axial direction of the first shaft can be restrained by the inner surface of the circumferential grooves 61 constituting the axial displacement restraining section. As a result, fluctuation of gap δ1 between the one end of the first detection tube 13 and the one end of the second detection tube 14, and fluctuation of gap δ2 between the other end of the first detection tube 13 and the one end of the third detection tube 15 can be prevented, both gaps δ1, δ2 can be set with high accuracy, and fluctuations of detection torque can be inhibited. Furthermore, the displacement in the circumferential direction of the magnetic leak prevention member 12 is restrained by the inner surface of the axial grooves 62 constituting the circumferential displacement restraining section, and fluctuations of magnetic resistance to magnetic flux in the first magnetic circuit are inhibited, thereby enabling highly accurate torque detection.

The present invention is not limited to the above-described embodiment. For example, because the amount of shrinkage of the magnetic leak prevention member 12 in the resin holding spaces 13A varies according to the type of the synthetic resin material and the number, depth, and width of circumferential groove 61 and axial groove 62, no specific limitation is placed on the inclination degree of the pressure-receiving surfaces 13a' to the axial direction of the first detection tube 13, and it can be set so that the synthetic resin material solidified in the resin holding spaces 13A is pressed against the teeth 13a due to shrinkage thereof. Furthermore, when compensation of temperature fluctuations or highly accurate torque detection is not required, or compensation of temperature fluctuations and increase in torque detection accuracy are enabled by other means, the third detection tube 15 is not necessary, and the axial displacement restraining section or circumferential displacement restraining section is also unnecessary. Furthermore, the torque sensor employing the present invention can be also used for detecting torque other than steering torque.

What is claimed is:

1. A torque sensor comprising:
a first shaft made from magnetic material;
a second shaft connected to said first shaft so that they can rotate elastically with respect to each other;
a magnetic leak prevention member made from nonmagnetic material and covering the outer periphery of said first shaft;
a first detection tube made from magnetic material and covering the outer periphery of said magnetic leak prevention member;
a second detection tube made from magnetic material, integrated with said second shaft so that they can rotate together, and disposed so that one end thereof faces one end of said first detection tube via a gap; and
a coil constituting a magnetic circuit by generating magnetic flux passing through the one end of said first detection tube and the one end of said second detection tube; wherein
a plurality of teeth that are arranged along the circumferential direction are provided at the one end of said first detection tube and at the one end of the second detection tube so that magnetic resistance to magnetic flux in said magnetic circuit changes according to the amount of relative rotation of the two shafts;
said magnetic leak prevention member is molded from synthetic resin material poured into a mold;
said first shaft and said first detection tube are integrated with said molded magnetic leak prevention member so that they can rotate together, by being inserted in said mold before the synthetic resin material is poured thereinto;

each space between said adjacent teeth arranged along the circumferential direction at the one axial end of said first detection tube serves as a resin holding space;

said magnetic leak prevention member has a portion solidifying in said resin holding spaces; and circumferential width of said resin holding space decreases gradually toward the other axial end of the first detection tube so that the synthetic resin material solidified in said resin holding spaces is pressed against said teeth due to shrinkage thereof.

* * * * *